US005362434A

United States Patent [19]

Hauser et al.

[11] Patent Number: 5,362,434

[45] Date of Patent: Nov. 8, 1994

[54] VERTICAL PRESS AND PROCESS FOR OPERATING THE SAME

[75] Inventors: Hans U. Hauser, Niederweningen, Switzerland; Jörg Lindemans, Trier; Martin Mick, Föhren, both of Germany

[73] Assignee: Laeis- Bucher GmbH, Trier, Germany

[21] Appl. No.: 50,284

[22] PCT Filed: Sep. 7, 1992

[86] PCT No.: PCT/CH92/00182

§ 371 Date: May 7, 1993

§ 102(e) Date: May 7, 1993

[87] PCT Pub. No.: WO93/04831

PCT Pub. Date: Mar. 18, 1993

[30] Foreign Application Priority Data

Sep. 11, 1991 [CH] Switzerland .................... 2672/91-7

[51] Int. Cl.[5] .................... B29C 33/00

[52] U.S. Cl. .................... 264/239; 425/167; 425/186; 425/258; 425/411; 425/454

[58] Field of Search .............. 425/186, 193, 195, 253, 425/258, 406, 411, 450.1, 452, 453, 454, 150, 167; 264/239

[56] References Cited

U.S. PATENT DOCUMENTS

| | | | |
|---|---|---|---|
| 3,084,387 | 4/1963 | Tochner et al. | 425/258 |
| 3,679,340 | 7/1972 | Springs | 425/186 |
| 4,439,123 | 3/1984 | Sano et al. | 425/195 |
| 4,490,103 | 12/1984 | Vogt | 425/193 |
| 4,631,015 | 12/1986 | Shigeo et al. | 425/195 |
| 4,795,334 | 1/1989 | Kitahara | 425/186 |
| 5,002,711 | 3/1991 | Iwama et al. | 425/186 |
| 5,211,966 | 5/1993 | Raudies et al. | 425/195 |

FOREIGN PATENT DOCUMENTS

| | | | |
|---|---|---|---|
| 100866 | 4/1965 | Denmark | 425/186 |

*Primary Examiner*—Charles S. Bushey
*Attorney, Agent, or Firm*—Edmund M. Jaskiewicz

[57] ABSTRACT

A vertical press, which has replaceable mold components, has lifting devices for lifting and conveying these parts. The lifting and conveying devices are mounted on a movable topmost mold carrier element of the press, so that the drive and control devices of this mold carrier element (4), which are provided for the pressing process, can be utilized simultaneously for the vertical movement of the lifting and conveying devices. By a programmed control, the necessary movements to shape-specific intermediate positions and coupling and decoupling processes to be performed at these positions are programmed for a series of shapes and can be performed automatically.

14 Claims, 2 Drawing Sheets

VERTICAL PRESS AND PROCESS FOR OPERATING THE SAME

FIELD OF THE INVENTION

The invention relates to a vertical press with at least three mold carrier elements, of which at least two are vertically movable and one is placed in a fixed position.

BACKGROUND OF THE INVENTION

A brickmaking press is disclosed in DE-A1-28 41 684 (BucherGuyer AG), in which the press dies have replaceable die plates. The production of molded parts by the pressing process on such vertical presses requires the installation and removal of corresponding replaceable molds on at least three mold carrier elements. At least one die each is attached to an upper or lower die carrier each; however, an extruding die is incorporated in mold carrier plate.

Depending on use, other similar systems necessitate the installation of other stationary or movable dies. The above-mentioned three or more mold elements are then moved against one another for press molding the poured-in raw materials. In this process, at least two mold elements are moved relative to the pressure mold. The top die presses from above downward and the frame of the pressure mold is also movable in the pressing direction. However, the lower die is attached securely to a lower crosspiece of the press frame and remains stationary.

Other systems have a stationary pressing table rigidly connected with the pressing system, but two movable dies. In another known system, all three mold elements are movable.

A change of the above-mentioned molds requires in each case the replacement of all mold elements. In this case, the latter remain incorporated in their frame or are connected with one another before the removal by connecting elements for joint removal. When large parts are pressed, the molds are correspondingly heavy, so that when molds are replaced, mechanical auxiliary means are necessary for insertion and removal.

In known presses, the changes of molds requires, in particular those heavy molds weighing one or several tons, the use of the above-mentioned mechanical devices, e.g., forklift trucks or hoists, by movement on an available change of mold carriage. Such processes involve a considerable expense equipment and labor by the relatively expensive hoists.

SUMMARY OF THE INVENTION

The object of the invention is to avoid such disadvantages and, simultaneously, to replace in a simple way and make accessible other parts of presses, such as mechanical mixers incorporated in the area of the hopper, for the purpose of cleaning, for maintenance or for repairs.

According to the invention, this is achieved with a vertical press of the initially mentioned type having lifting means for replaceable parts of the press, which are attached to the topmost mold carrier element and are movable at least partially in horizontal and/or vertical direction.

An essential feature of the invention is that the topmost mold carrier element, to which the lifting means are attached, is vertically movable, and the vertical movement of the lifting means results from this movement.

According to another feature of the invention, the lifting means, seen from a front side of the press, is movable forward and/or backward horizontally up to outside the area of the press. In this case, the lifting means suitably are attached to the topmost mold carrier element outside the area which carries the mold.

The lifting means preferably comprise two guide rails, which are attached to two opposite sides of the topmost mold carrier element on the underside thereof, two running elements mounted at a permanent distance to each guide rail, as well as a swivelable, elongated lifting element parallel to the guide rail on each running element.

According to another feature of the invention, a programmed control for the movable mold carrier elements and lifting means is provided which controls the vertical movements by steps and positions assigned and determined to the specific molds.

A process for an advantageous operation of the vertical press, in which a movable unit for receiving the mold carrier element for the compression mold is vertically movable between the topmost and a bottommost mold carrier element and the mold carrier element has devices for coupling replaceable parts, is characterized in that the replaceable parts are conducted into a suitable position for coupling to the lifting means with the vertically movable unit and by spacing coupling elements, coupled to one another and coupled as a package to these lifting means, and the lifting means themselves are not moved vertically.

The advantage achieved with the invention consists in the fact that the handling of the press is substantially simplified and existing press controls can easily be utilized for control of the lifting means and for replacing parts.

BRIEF DESCRIPTION OF THE DRAWING

The invention is explained in more detail in the following description and the figures of the drawing. There are shown in FIG. 1 a perspective view of a pressing device according to the invention as an example, and FIG. 2 a diagrammatic view of a pressing device according to the invention which exhibits a hopper.

DESCRIPTION OF THE PREFERRED EMBODIMENTS

Figure 1:
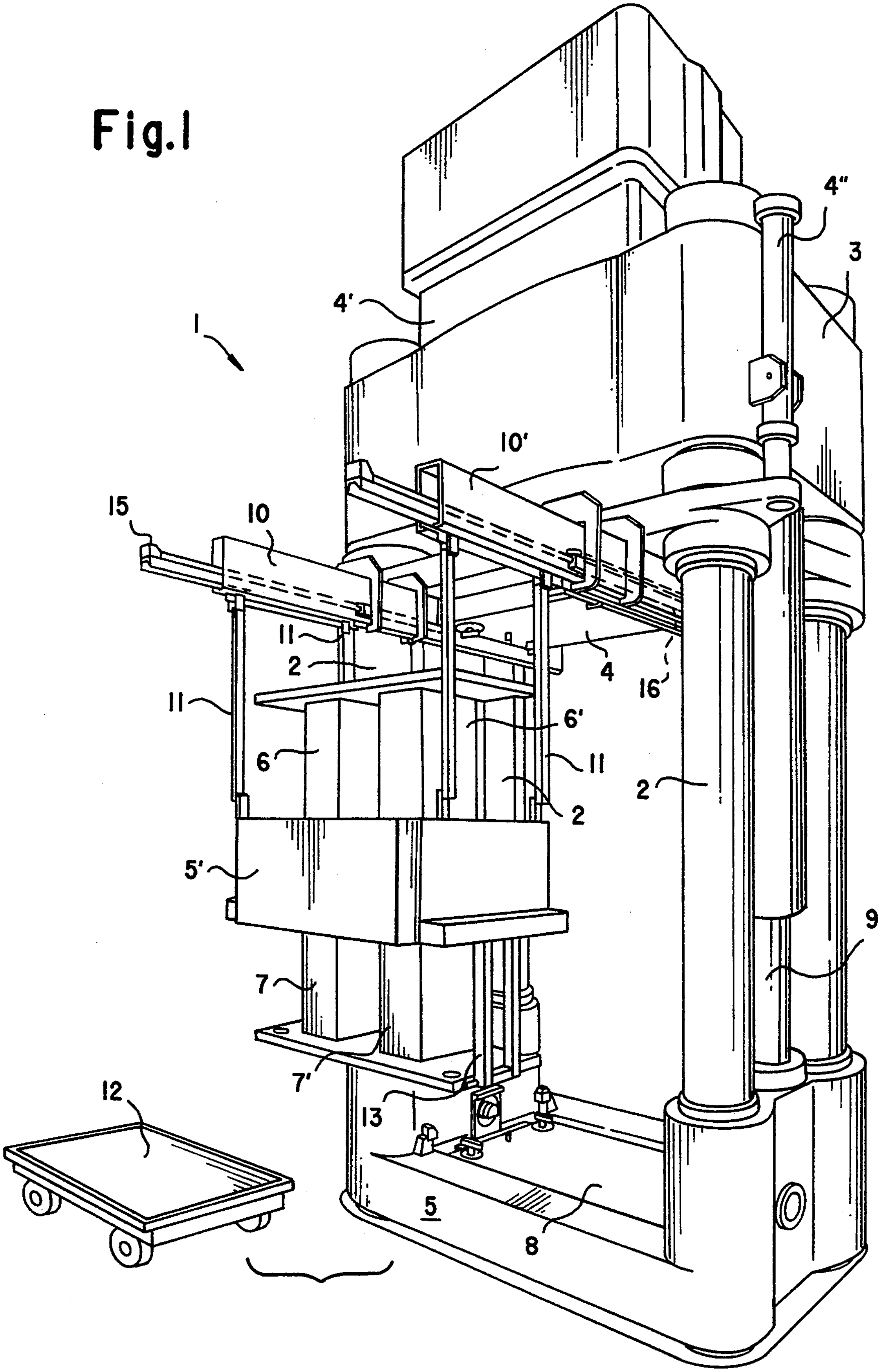

As FIG. 1 shows, the illustrated pressing device basically comprises a hydraulically operated four-column press 1. On the upper end of four columns 2, a yoke 3 is placed, in which a mold carrier element 4 also guided on columns 2 is mounted. Mold carrier element 4 has a hydraulic drive 4' placed inside yoke 3 for lowering and another hydraulic drive 4" for lifting. Mold carrier element 4 is assigned to a unit 5 located on the lower end of columns 2 and also movable along columns 2, unit which can receive another mold carrier element 5' movable together with unit 5. Mold carrier element 5' is shown in a position outside unit 5 and is constructed as a shell mold, in which two upper dies 6, 6' and two lower dies 7, 7' engage.

In the pressing process, upper dies 6, 6' are attached to mold carrier element 4 and the lower dies are attached to a mold carrier element 8 and together with mold carrier element 5', include the product to be pressed. Movable unit 5 is raised and lowered by two piston rods 9, of which only one is visible, however, mold carrier element 8 is not movable. The shell mold of mold carrier element 5' is filled with molding material by a filling slide, not shown, which moves the molding material by the shell mold of mold carrier element 5' from outside columns 2 by a support, also not shown. The molding material can be, for example, ceramic sand, which is to be processed into refractory bricks.

The method of operation of the press basically corresponds to that of usual presses, as it is described, for example, in DE-OS 27 41 800.

As FIG. 1 shows, guide rails 10, 10' each in the form of a shell profile as shown are attached to topmost mold carrier 4 on two opposite sides. These guide rails 10, 10' project forward from the area of four-column press 1 and carry two running elements 15 each, to which an elongated lifting element 11 each is attached. The distance of the running elements in each guide rail 10 or 10' is maintained constant by spacers, not shown, and lifting elements 11 are attached to swivel to the running elements with hinges in the direction parallel to guide rails 10 or 10'. The running elements have hydraulic drive elements 16 for movement in the guide rails.

As can be seen, a package, or mold assembly, is suspended on lifting elements 11, which consists of two upper dies 6, 6', two lower dies 7, 7' and mold carrier element 5', which are coupled together by spacing coupling elements 13. The components of this package are specific for the shape of the product to be pressed and for a change of this shape are pulled out from four-column press 1 as shown, by the above-described lifting and conveying means and put down on a change of mold cart 12. In this connection, hydraulic drive 4' and a related drive control of topmost mold carrier element 4 are utilized in a suitable way for tile vertical movement of the above-mentioned package, as well as also its individual parts. In particular, this vertical movement is also used even before the horizontal moving of the package for coupling mold carrier elements 6, 6', 7, 7', 5' by spacing coupling elements 13.

Figure 2:
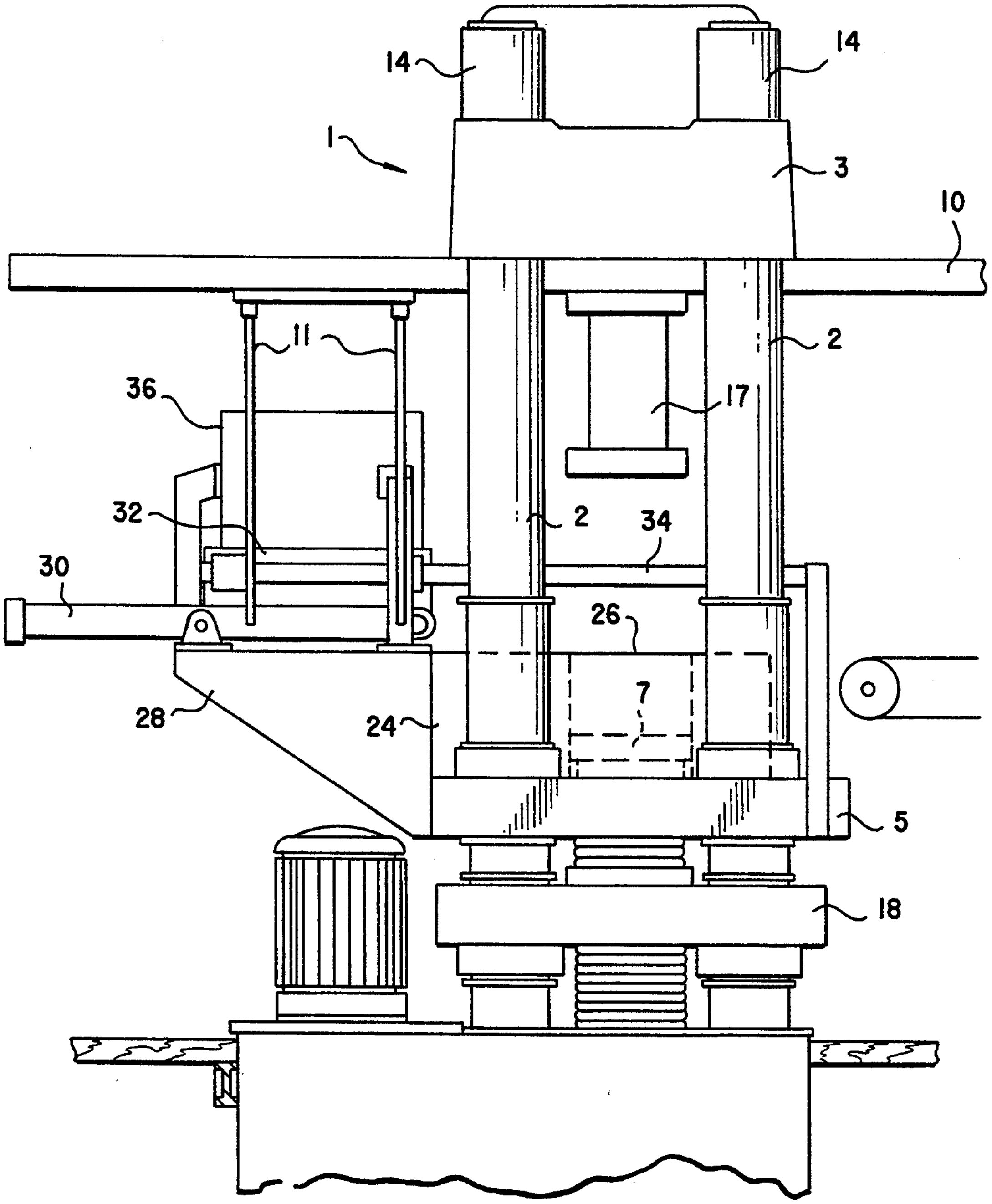

A second embodiment of a hydraulic four-column brick-making press according to the invention is represented in FIG. 2, in which reference symbols, which also occur in FIG. 1, designate corresponding components. On the upper end of four columns 2, a yoke 3 is placed, which is secured by columnar nuts 14 against a removal from columns 2 during the pressing process. A piston 17 projecting downward is attached in a fixed position in the center of yoke 3. A press plate 18, movable along the columns, in whose center a piston 7 projects upward, is placed on the lower end of columns 2. A unit 5 also movable along columns 2, to which a molding case 24 is attached, is placed on press plate 18. Molding case 24 exhibits a shell mold 26. The bottom of shell mold 26 is formed by piston 7.

Besides molding case 24 outside of columns 2, there is a support 28, which is placed on movable unit 5 and carries a hydraulic device 30 to move a material container 32 open on top and on the bottom. Material container 32 is guided by guide rods 34. Further, a feed hopper 36 is provided on support 28 for filling material container 32. To fill shell mold 26, molding case 24 can be aligned against support 28 so that together they form a table, on which material container 32 can be moved from feed hopper 36 to shell mold 26.

Similar to the embodiment of FIG. 1, the embodiment of FIG. 2 is also equipped with two guide rails, of which front guide rail 10' can be seen in FIG. 2. Two elongated, lifting elements 11 swivelable parallel to guide rail 10' are mounted horizontally movable on running elements on each guide rail 10'. Material container 32, which is used as a hopper as described above, has a hopper-mixer, not represented in a way known in the art, which mixes the raw material coming from feed hopper 36. Hopper 32 and hopper-mixer are provided as replaceable parts of press 1 with devices, not represented, for coupling to lifting elements 11. After performing such a coupling, support 28 is dropped vertically with movable unit 5 and hoppers 32 remaining on lifting elements 11, hopper-mixers or their parts or assemblies are conveyed forward horizontally up to outside the area of press 1 for cleaning and/or inspection.

The invention comprises other features not represented in detail in the drawing but suitable. Thus, lifting elements 11 for replaceable parts 5', 6, 6', 7, 7' can be equipped with centrally controllable coupling elements, and a related control simultaneously assumes the central control of the horizontal and vertical movement of the lifting means. Such coupling elements can also be constructed as rapid-action couplings. Such a control is then advantageously designed programmable so that the movements necessary for the change of the mold carrier elements for different shapes of the press products toward matching intermediate positions and toward the coupling and decoupling processes to be performed at these positions are programmed for a series of shapes and can be performed automatically.

It will understood that this invention is susceptible to modification in order to adapt it to different usages and conditions, and accordingly, it is desired to comprehend such modifications within this invention as may fall within the scope of the appended claims.

We claim:

1. A vertical press comprising at least three vertically disposed mold carrier elements at least two of which are vertically movable, supporting means on an uppermost one of said mold carrier elements for supporting therefrom a second one of said mold carrier elements such that vertical movement of said uppermost mold carrier element lifts or lowers said second mold carrier element, said second mold carrying element comprising replaceable mold components and being movable horizontally on said supporting means.

2. Vertical press according to claim 1 wherein the vertical movement of the uppermost mold carrier element (4) is by means of hydraulic drives (4', 4'').

3. Vertical press according to claim 1 wherein lifting means (11), are movable forward and backward horizontally to outside the area of the press.

4. Vertical press according to claim 1 wherein lifting means (11) are attached to the uppermost mold carrier element (4) outside the area which carries a mold (6,6').

5. Vertical press according to claim 1 wherein the supporting means (10, 10') further comprise lifting means (11) for coupling to the replaceable parts, and a control with which the elements for coupling and the horizontal and vertical movement of the supporting means is centrally controlled.

6. Vertical press according to claim 1 wherein the supporting means (10, 10') are attached at least partially permanently to the uppermost mold carrier element (4).

7. Vertical press according to claim 1 wherein lifting means elements (11) comprise rapid-action couplings for coupling to a replaceable mold carrier element (5').

8. Vertical press according to claim 2, wherein the supporting means comprise two guide rails (10, 10'), which are attached to two opposite sides of the uppermost mold carrier element (4), two running elements (15) mounted at a fixed distance on each guide rail, and an elongated lifting element (11) pivotable in a plane parallel to guide each respective rail (10, 10') on each running element.

9. Vertical press according to claim 1 comprising a programmed control for movable mold carrier elements (4, 5) and supporting means (10, 10', 11), which controls the vertical movements by steps and positions assigned shape-specifically to various molds.

10. Vertical press according to claim 1 which further comprises a hopper (32) and a hopper-mixer, wherein at least portions of said hopper (32) and hopper-mixer comprise devices for the coupling of supporting means to the replaceable parts.

11. Vertical press according to claim 10, wherein lifting means are capable of lowering the portions of hoppers and hopper-mixers below the level of a pressing table (24, 28), which carries a mold carrier element for a pressure mold.

12. A process for operating a vertical press having three vertically disposed mold carrier elements of which the uppermost and lowermost are vertically movable, the steps comprising suspending from the uppermost mold carrier element a second one of the mold carrier elements, coupling replaceable mold components to the second mold carrier element to form a mold assembly, moving vertically the uppermost mold carrier element to raise or lower the mold assembly, and moving the mold assembly horizontally while suspended from the uppermost mold carrier element to enable the mold assembly to be removed and replaced.

13. A process for operating a vertical press having three vertically disposed mold carrier elements of which the uppermost and lowermost are vertically movable, the steps comprising attaching a lifting structure to the uppermost mold carrier element, coupling replaceable mold components to the second mold carrier element to form a mold assembly, moving the lowermost mold carrier element upwardly to contact and raise the mold assembly upwardly into a predetermined position, and coupling the mold assembly in its predetermined position to the lifting structure on the uppermost mold carrier element to suspend the mold assembly therefrom.

14. A process as claimed in claim 13 and the further step of moving the suspended mold assembly horizontally outwardly of the press to remove and replace the mold assembly.

* * * * *